United States Patent [19]

Wakai

[11] 4,395,755
[45] Jul. 26, 1983

[54] INFORMATION PROCESSING SYSTEM AND LOGOUT PROCESS THEREFOR

[75] Inventor: Katsuro Wakai, Hadano, Japan

[73] Assignee: Hitachi, Ltd., Tokyo, Japan

[21] Appl. No.: 232,001

[22] Filed: Feb. 6, 1981

[30] Foreign Application Priority Data

Feb. 6, 1980 [JP] Japan ................................ 55-12519

[51] Int. Cl.³ ............................................. G06F 11/00
[52] U.S. Cl. .................................... 364/200; 371/18; 371/29
[58] Field of Search ............................ 371/29, 16, 18; 364/200, 900

[56] References Cited

U.S. PATENT DOCUMENTS

| | | | |
|---|---|---|---|
| 3,831,148 | 8/1974 | Greenwald et al. | 364/200 |
| 3,937,938 | 2/1976 | Matthews | 371/29 |
| 4,271,402 | 6/1981 | Kastura et al. | 371/29 |
| 4,335,425 | 6/1982 | Goto et al. | 364/200 |

Primary Examiner—Charles E. Atkinson
Attorney, Agent, or Firm—Antonelli, Terry & Wands

[57] ABSTRACT

An information processing system and a logout process therefor wherein when an error takes place in a storage control unit the storage control unit is inhibited from receiving storage access requests from other processing units such as basic processing unit and I/O processing unit and the error is reported to a maintenance control unit, the said other processing units are inhibited from performing time-out detecting operation, internal information of the storage control unit at the time when the error takes place is fetched therefrom and stored in the maintenance control unit, then the inhibition of the storage access request reception and the inhibition of the time-out detecting operation are removed, and the internal information is transferred from the maintenance control unit to a certain memory for later analysis of the error.

9 Claims, 2 Drawing Figures ived from detecting the occurrence of a
INFORMATION PROCESSING SYSTEM AND LOGOUT PROCESS THEREFOR

BACKGROUND OF THE INVENTION

The present invention relates to an information processing system, and more particularly to an information processing system in which logout is possible for a storage control unit which controls a main storage in response to a main storage access request from an I/O processing unit and/or a basic processing unit, and to a logout process therefor.

A modern information processing system, particularly a large scale information processing system typically comprises an organic combination of one or more main storages, storage control units, basic processing units, I/O processing units and maintenance control units. When an error occurs in any one of these units, it is necessary to output internal status information (error information) at the time of the occurrence of the error of the unit, analyze the status information and rapidly repair the fault unit where the error has occurred.

Since the main storage mainly consists of an assembly of memory elements, its reading and writing operations are controlled by the storage control unit. Thus, the main storage includes only a small number of logic circuits and not any error detector. The storage control unit is provided with an error detector for the main storage. When an error is detected, the storage control unit delivers its internal information for use in correcting the error. Meanwhile, when an error occurs in the I/O processing unit or in the basic processing unit, the fault unit in error is temporarily self-frozen at the time of the occurrence of the error so that the internal information at that moment is stored in the main storage via the storage control unit in preparation for the subsequent output of the information. In this manner, the error information for use in correcting the error is made available.

The error detection and correction discussed above are described in the chapter "Machine-Check Handling" of a manual entitled "IBM System/370 Principles of Operations" GA22-7000-3 published by International Business Machines Corporation in 1973.

However, when an error occurs in the storage control unit, it has been difficult to obtain error information in the same manner as was done when an error occured in the other units. Since the storage control unit always sequentially receives storage access requests from a plurality of processing units, if an error occurs in the storage control unit and the unit is temporarily frozen to store its internal information in the main storage, the basic processing unit and the I/O processing unit will detect a time-out for the storage access request and these units will stop operation. As a result, the entire system will stop its operation. It is a function of the maintenance control unit to read out the internal information of a fault unit and store it in the main storage (which function is called a logout). Because storing of information in the main storage is done via the storage control unit, it is apparent that the logout for the storage control unit will be impossible if the storage control unit is frozen.

SUMMARY OF THE INVENTION

It is an object of the present invention to provide an information processing system including a storage control unit, which may be subjected to an error, and being capable of logging out internal information of the storage control unit at the time when an error takes place in order to permit the analysis of the error.

It is another object of the present invention to provide a logout process for the storage control unit of an information processing system.

In one aspect of the present invention, when an error occurs in the storage control unit, the error is detected by detecting means within the unit and subsequently the storage control unit interrupts reception of storage access requests and maintains the internal information of its own and it also reports the error to the maintenance control unit. In response thereto, the maintenance control unit inhibits the other constituent units of the information processing system from detecting a time-out in their storage access requests and stores the internal information of the storage control unit in a buffer memory in the maintenance control unit. Thereafter, the maintenance control unit removes the inhibition of the storage control unit from the reception of the storage access requests and then causes the main storage to store the contents of the buffer memory via the storage control unit and it also removes the inhibition of the above-mentioned other constituent units from the time-out detection.

DESCRIPTION OF THE PREFERRED EMBODIMENTS

Figure 1:
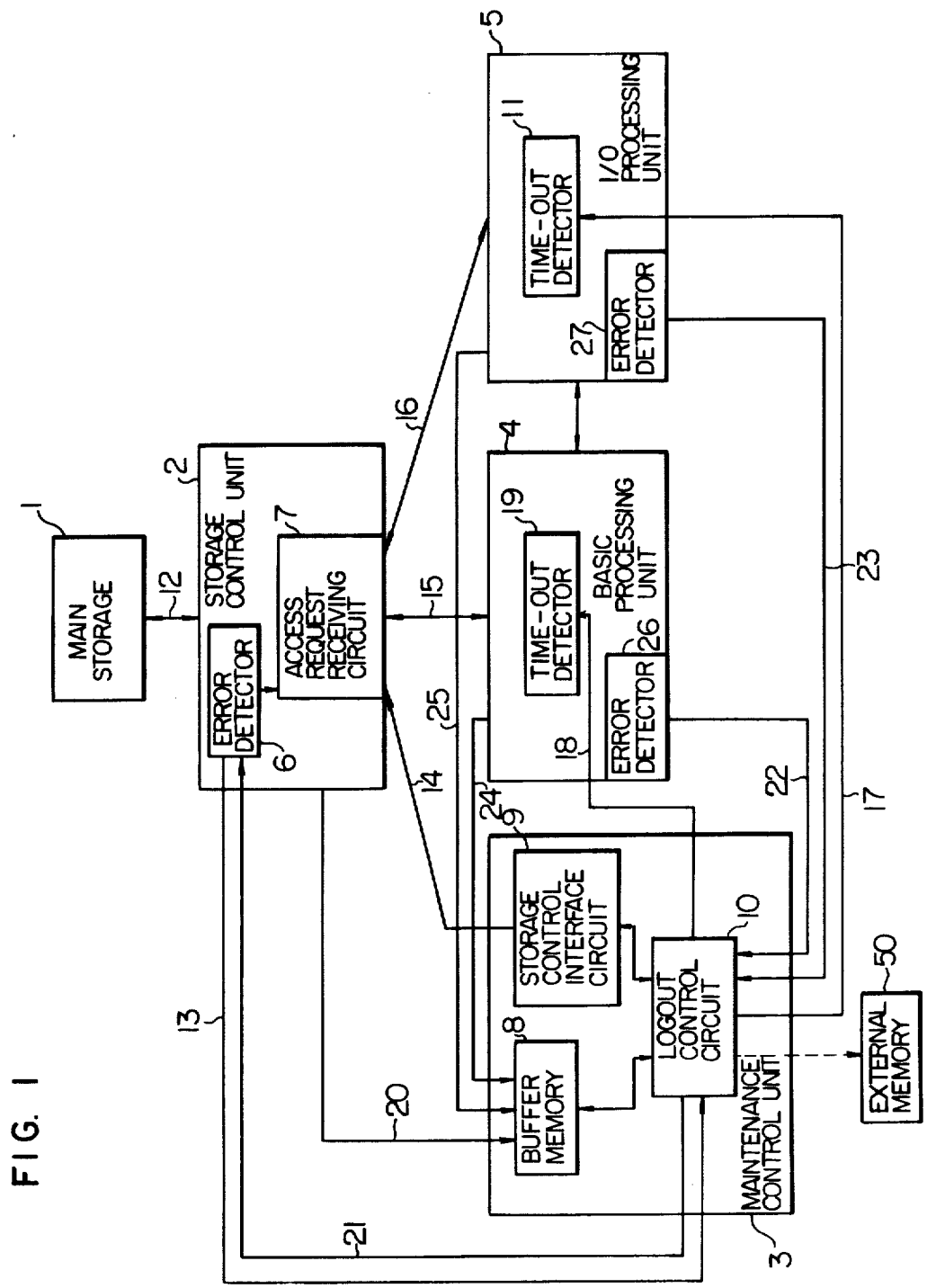
FIG. 1 is a block diagram of an information processing system in accordance with an embodiment of the present invention, which is also useful for explaining a logout process for the storage control unit of the system.

Referring to FIG. 1, the information processing system comprises a main storage 1, a storage control unit 2, processing units such as a basic processing unit 4 and an I/O processing unit 5 and a maintenance control unit 3 for the units 2, 4 and 5. The I/O processing unit 5 performs data input/output control under instructions from the basic processing unit 4. The storage control unit 2 includes an error detector 6 and an access request receiving circuit 7 and is interposed between the main storage 1 and the units 3, 4 and 5 to receive storage access requests issued from the units 3, 4 and 5 via interface lines 14, 15 and 16 at the access reception circuit 7 to control the access to the main storage 1 via an interface line 12. The storage control unit 2, the basic processing unit 4 and the I/O processing unit 5 include error detectors 6, 26 and 27, respectively, for reporting the occurrence of errors in their own units, when they are detected, to the maintenance control unit 3 via signal lines 13, 22 and 23, respectively. The basic processing unit 4 and the I/O processing unit 5 further include time-out detectors 19 and 11, respectively. The storage control unit 2 also includes a time-out detector but it is not shown in the drawing because it has no connection with the present invention. The maintenance control unit 3 includes a buffer memory 8 which can store internal information of the storage control unit 2, the basic processing unit 4 and the I/O processing unit 5 via interface lines 20, 24 and 25, respectively, a logout control circuit 10 responsive to the reception of the error detection from the error detectors 6, 26 and 27 of the units 2, 4 and 5, respectively, to provide a control signal, to be described hereinlater, to the receiving circuit 7 of the storage control unit 2 and to the time-out detectors 19 and 11 of the units 4 and 5, and a storage control interface circuit 9 for supplying data to the receiving circuit 7 of the storage control unit 2 via the interface line 14 under the control of the logout control circuit 10.

In the storage control unit 2, the error detector 6 serves to inhibit the receiving circuit 7 from receiving storage access requests, in response to occurrence of an error in the unit 2. The error detector 6 in the storage control unit 2 responds to the control signal supplied from the logout control circuit 10 of the maintenance control unit 3 via the signal line 21 to remove the inhibition of the receiving circuit 7 from receiving storage access requests.

The logout operations in the basic processing unit 4 and the I/O processing unit 5 are identical to those in a prior art system. If an error is detected in any one of these units 4 and 5, the fault unit in error is self-frozen and the error detector 26 or 27 reports the error via the signal line 22 or 23. When the logout control circuit 10 of the maintenance control unit 3 receives the error report, the internal information of the unit 4 or 5 is stored in the buffer memory 8 via the signal line 24 or 25 under the control of the logout control circuit 10. Thereafter, the storage control interface circuit 9 causes the main storage 1 to store the content of the buffer memory 8 via the storage control unit 2 through the interface line 14 under the control of the logout control circuit 10. In this manner, the internal information of the fault unit is logged out to the main storage 1. The information is then supplied to an external device for the analysis of the error.

The logout process of the storage control unit 2 which is the subject of the present invention is now explained.

When the error detector 6 in the storage control unit 2 detects an error in the unit 2, it immediately inhibits the receiving circuit 7 from receiving storage access requests and reports the occurrence of the error to the logout control circuit 10 of the maintenance control unit 3 via the signal line 13. The operation of the error detector 6 of the storage control unit 2 may be in the form of a parity check which is common in a conventional information processing system.

The logout control circuit 10 inhibits the time-out detector 19 in the basic processing unit 4 and the time-out detector 11 in the I/O processing unit 5 from performing the time-out detecting operation via the signal lines 18 and 17, respectively. In response to the inhibition, the logout control circuit 10 fetches the internal information of the storage control unit 2 representing the status at the time when the error took place, via the interface line 20 and stores it in the buffer memory 8 sequentially. Upon the completion of this storing operation, the logout control circuit 10 instructs, via the signal line 21, the error detector 6 to remove the inhibition of the storage access request reception, and instructs the I/O processing unit 5 and the basic processing unit 4, via the signal lines 17 and 18, to restart the operation of the time-out detectors 11 and 19. Finally, the logout control circuit 10 stores the content of the buffer memory 8 into the main storage 1 via the storage control unit 2 through the interface line 14 and the storage control interface circuit 9. Through this series of operations, the internal information of the storage control unit 2 at the time when the error took place is stored into the main storage 1. Thereafter, the information is supplied to an external device for the analysis of the error as is done in the conventional information processing system.

Figure 2:
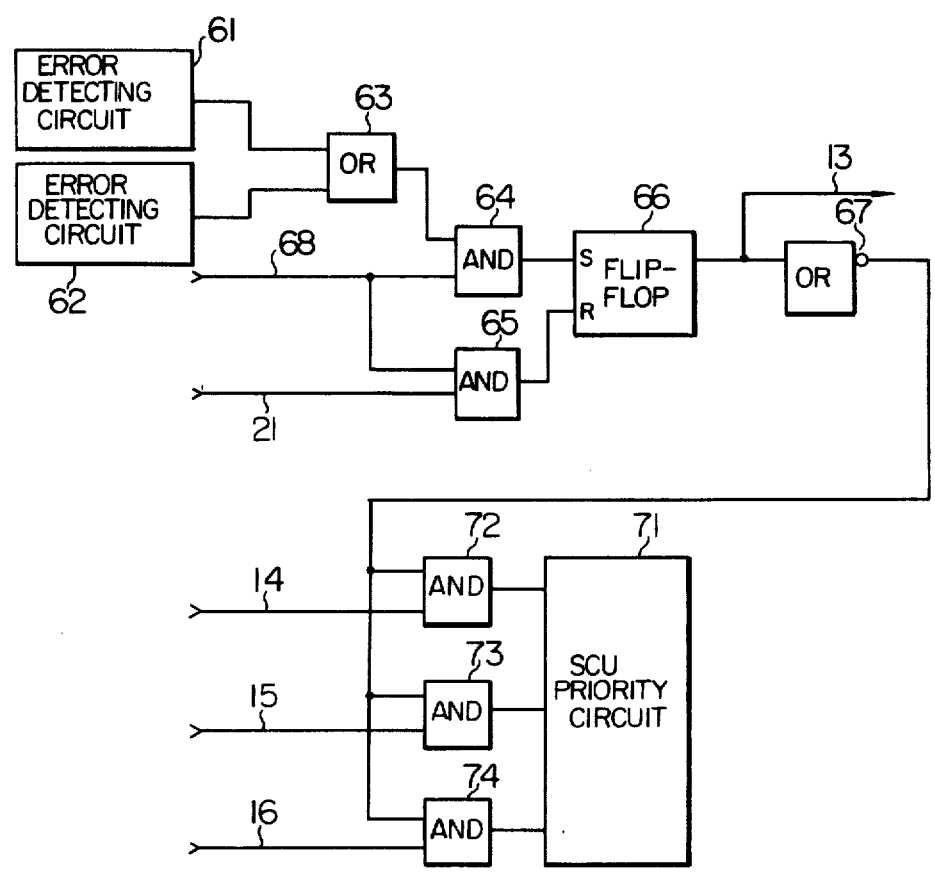
FIG. 2 is a block diagram of a major portion of the storage control unit shown in FIG. 1.

FIG. 2 shows those portions of a mutual arrangement of the access request receiving circuit 7 and the error detector 6 of the storage control unit 2, which portions are concerned with an embodiment of the invention. The error detector 6 comprises a plurality of (two in the illustrated embodiment) error detecting circuits 61 and 62, an OR circuit 63 coupled to outputs of the circuits 61 and 62, an AND circuit 64 having one input terminal for receiving a clock signal through a line 68 and the other input terminal for receiving the output of the OR circuit 63, an AND circuit 65 having one input terminal for receiving the clock signal via the line 68 and the other input terminal for receiving a removal signal from the logout control circuit 10 of the maintenance control circuit 3 via the signal line 21, a flip-flop 66 having a set terminal coupled to the output of the AND circuit 64 and a reset terminal coupled to the output of the AND circuit 65, and an inverter 67 (constituted by an OR circuit) for inverting the output of the flip-flop 66. The signal line 13 for reporting the error is coupled to the output of the flip-flop 66. On the other hand, the receiving circuit 7 comprises AND circuits 72, 73 and 74 each having one input terminal coupled to the output of the inverter 67 and having other input terminals connected to the interface lines 14, 15 and 16, respectively, and a SCU priority circuit 71 coupled to outputs of the AND circuits 72, 73 and 74 for performing priority decision processing.

The clock signal on the line 68 assumes a logical "1" in synchronism with a time immediately before the start of operation of the receiving circuit 7. If an error takes place at any portion of the storage control unit 2, a logical "1" signal is applied from one of the plurality of error detecting circuits (e.g. the circuit 61) to the AND circuit 64 via the OR circuit 63. Since the clock pulse on the line 68 assumes logical "1" at the time immediately before the start of the operation of the access request reception circuit 7, the flip-flop 66 is set to "1" by the error. The output from the flip-flop 66 is supplied, as a report of the occurrence of the error, to the maintenance control unit 3 via the signal line 13 and is also supplied to the first inputs of the AND circuits 72, 73 and 74 via the inverter 67. The signal lines 14, 15 and 16 carry the storage access requests from the maintenance control unit 3, the basic processing unit 4 and the I/O processing unit 5, respectively. Whether any error has occurred or not in the storage control unit 2 is checked by the AND circuits 72, 73 and 74 before the requests are applied to the SCU priority circuit 71. Then, the maintenance control unit 3 reads out the internal information of the storage control unit 2 to store it in the buffer memory 8 and instructs the error detector 6 to reset the flip-flop 65 through the signal line 21. The removal signal on the signal line 21 is synchronized by the clock signal on the line 68 and resets the flip-flop 66. When the flip-flop 66 assumes a logical "0" state, the AND gates 72, 73 and 74 are opened to allow the reception of the storage access requests via the interface lines 14, 15 and 16.

In a modification of the embodiment described above, the internal information of the storage control circuit 2 stored in the buffer memory 8 at the time when the error took place may be stored in an external memory 50 rather than in the main storage 1, as shown by a broken line in FIG. 1, under the control of the logout control circuit 10.

In the embodiment and the modification thereof described above, storing of the internal information of the units 4 and 5 in the buffer memory 8, the configuration therefor, the reception of the report of the errors in the units 4 and 5 by the logout control circuit 10 and the configuration therefor are not material to the present invention.

During the logout process by the storage control unit 2, the I/O processing unit 5 and the basic processing unit 4 are unable to access the main storage for a short period (approximately one second). This will raise no problem in the basic processing unit 4 but the I/O processing unit 5 is affected in such a degree that I/O devices connected thereto may overrun. However, since such an overrun can be automatically recovered by hardware or software, no essential problem will occur.

As described hereinabove, in accordance with the present invention, the logout process of the storage control unit can be rapidly carried out so that the intermittent error in the information processing system is readily corrected.

I claim:

1. An information processing system comprising a main storage, at least one processing unit, a storage control unit and a maintenance control unit for said storage control unit and said processing unit, said storage control unit being interposed between said main storage and said maintenance control unit as well as between said main storage and said processing unit for controlling said main storage upon receipt of storage access requests from said maintenance control unit and said processing unit, and in which:

said processing unit includes means for detecting a timeout and for inhibiting said storage control unit in response thereto;

said storage control unit includes means responsive to detection of an error in said storage control unit for inhibiting said storage control unit from receiving said storage access requests and for reporting said detected error to said maintenance control unit; and said maintenance control unit includes logout control means responsive to reception of said reported error in said storage control unit for inhibiting said time-out detecting means in said processing unit, and buffer memory means responsive to said inhibiting of said time-out detecting means for fetching from said storage control unit internal information representative of the state of said storage control unit at the time when said error took place and for storing said fetched internal information;

said error detection means in said storage control unit including means responsive to said logout control means at the completion of said internal information storing in said maintenance control unit for removing said inhibiting of said storage access request reception.

2. A system according to claim 1, in which said at least one processing unit includes a basic processing unit and an input/output processing unit.

3. A logout process for an information processing system including a main storage, at least one processing unit, a storage control unit and a maintenance control unit for said storage control unit and said at least one processing unit, said storage control unit serving to receive storage access requests from said maintenance control unit and said at least one processing unit, the process comprising the steps of:

inhibiting said storage control unit from receiving storage access requests when an error takes place in said storage control unit;

reporting said error to said maintenance control unit;

inhibiting said processing unit from performing time-out detecting operation in response to said reporting of said error;

fetching from said storage control unit internal information representative of the state of said storage control unit at the time when said error took place and storing it in said maintenance control unit in response to said inhibiting of said time-out operation;

removing said inhibiting of said storage access request reception and said time-out detecting operation in response to said storing of said internal information; and transferring said internal information from said maintenance control unit to a storing means.

4. A logout process according to claim 3, in which said storing means is said main storage.

5. A logout process according to claim 3, in which said storing means is an external memory.

6. An information processing system comprising a main storage, at least one processing unit, a storage control unit, a maintenance control unit for said storage control unit and said at least one processing unit, said storage control unit being interposed between said main storage and said maintenance control unit and between said main storage and said at least one processing unit for controlling said main storage upon receipt of storage access requests from said maintenance control unit and said at least one processing unit, and a storage means, in which:

said at least one processing unit includes means for detecting a time-out;

said storage control unit includes means for detecting an error in said storage control unit and means responsive to an error detection by said error detecting means for inhibiting said storage control unit from receiving said storage access requests; and said maintenance control unit includes buffer memory means connected with said storage control unit for storing internal information representative of the state of said storage control unit at the time when said error took place and logout control means for control of a logout of said internal information, said logout control means being responsive to said error detection by said error detecting means in said storage control unit for inhibiting time-out detection by said time-out detecting means in said processing unit, and for instructing storage of said internal information in said buffer memory means, said logout control means removing, after storage of said internal information in said buffer memory means, said inhibiting of said storage access request reception by said storage control unit and removing said inhibiting of said time-out detecting operation by said time-out detecting means, and said logout control means then transferring said internal information from said maintenance control unit to said storage means.

7. A system according to claim 6, in which said storage means is constituted by part of said main storage.

8. A system according to claim 6, in which said storing means is constituted by an external memory.

9. A system according to claim 6, in which said at least one processing unit comprises a basic processing unit and further comprising an input/output processing unit also connected to said storage control unit and including further time-out detecting means controlled by said logout control means.

* * * * *